United States Patent
Cook

(10) Patent No.: US 9,171,381 B1
(45) Date of Patent: Oct. 27, 2015

(54) SYSTEM AND METHOD FOR RENDERING AN IMAGE OF A FRAME OF AN ANIMATION

(71) Applicant: KABAM, INC., San Francisco, CA (US)

(72) Inventor: Ramond Cook, Castro Valley, CA (US)

(73) Assignee: Kabam, Inc., San Francisco, CA (US)

( * ) Notice: Subject to any disclaimer, the term of this patent is extended or adjusted under 35 U.S.C. 154(b) by 345 days.

(21) Appl. No.: 13/659,801

(22) Filed: Oct. 24, 2012

(51) Int. Cl.
*G06T 15/00* (2011.01)
*G06T 7/20* (2006.01)
*G06F 17/30* (2006.01)

(52) U.S. Cl.
CPC ........ *G06T 7/2053* (2013.01); *G06F 17/30902* (2013.01)

(58) Field of Classification Search
CPC ............ G06F 15/177; G06F 17/30902; G06T 7/2053
USPC ................... 345/473, 474, 475, 614; 382/305; 709/201
See application file for complete search history.

(56) References Cited

U.S. PATENT DOCUMENTS

| | | | |
|---|---|---|---|
| 5,644,758 A | 7/1997 | Patrick et al. .................. | 395/525 |
| 5,880,739 A | 3/1999 | Collins ......................... | 345/433 |
| 6,307,559 B1 | 10/2001 | Hancock et al. ............... | 345/433 |
| 6,377,272 B1 | 4/2002 | Chatterjee et al. ............. | 345/605 |
| 6,567,091 B2 | 5/2003 | Dye et al. ...................... | 345/501 |
| 6,943,804 B2 | 9/2005 | Alcorn et al. .................. | 345/582 |
| 7,508,397 B1 | 3/2009 | Molnar et al. ................. | 345/562 |
| 8,106,909 B2 * | 1/2012 | McDowell ..................... | 345/473 |
| 8,358,879 B2 * | 1/2013 | McDowell ..................... | 382/305 |
| 8,421,821 B2 * | 4/2013 | Nystad et al. .................. | 345/614 |
| 8,793,301 B2 * | 7/2014 | Wegenkittl et al. ............ | 709/201 |
| 2008/0186325 A1 | 8/2008 | Higgins et al. ................. | 345/592 |
| 2009/0138544 A1 | 5/2009 | Wegenkittl et al. ............ | 709/203 |
| 2010/0245917 A1 | 9/2010 | Nguyen et al. ................ | 358/1.17 |
| 2011/0109640 A1 | 5/2011 | Lawrence ...................... | 345/582 |
| 2011/0142334 A1 | 6/2011 | Abdo et al. .................... | 382/165 |
| 2012/0218381 A1 | 8/2012 | Uro et al. ........................ | 348/43 |

* cited by examiner

*Primary Examiner* — Phu K Nguyen
(74) *Attorney, Agent, or Firm* — Sheppard, Mullin, Richtek & Hampton, LLP

(57) ABSTRACT

An exemplary system and method for recursively rendering an image, including marking renderable items of the image that have changed from a previous image, are provided. In some implementations, a client computing device may receive a plurality of frames as part of an animation. An image list may be maintained, where the image list is configured to store one or more references to one or more respective bitmap objects associated with a first image of a first frame in the animation. The bitmap objects referenced in the image list may be marked as having changed from the first image to the second image. The second image may be rendered based on the marked bitmap objects in the image list.

28 Claims, 6 Drawing Sheets

SYSTEM AND METHOD FOR RENDERING AN IMAGE OF A FRAME OF AN ANIMATION

FIELD

The disclosure relates to recursively rendering an image via a client computing platform, including marking renderable items of the image that have changed from a previous image.

BACKGROUND

Various techniques for rendering, caching, and/or retrieving an image comprising bitmap objects via a client computing platform are known. With high-performance flash technology, rendering systems that draw bitmap data to a screen may have higher performance. A bitmap may generally comprise data structure comprising a rectangular grid of pixels. An object delineated in the grid may be a renderable item of the bitmap.

Conventional bitmap rendering technology suffers from various drawbacks and inefficiencies. For example, when rendering a plurality of images as part of an animation, conventional bitmap rendering systems generally render all of the renderable items in each image, including renderable items that have not changed from a previous image. As such, a time to render a bitmap image of a frame that has changed only slightly from the previous frame may be equal to the time to render a bitmap image of a frame that may be completely different from the previous frame.

SUMMARY

One aspect of the disclosure relates to recursively rendering an image via a client computing platform, including marking renderable items of the image that have changed from a previous image. In some implementations, a client computing device may receive a plurality of frames as part of an animation. An image list may be maintained, where the image list may be configured to store one or more references to one or more respective bitmap objects associated with a first image of a first frame in the animation. The bitmap objects referenced in the image list may be generated in response to obtaining information defining a vector image of the first image frame in an animation.

In some implementations, a reference to a bitmap object in the image list may comprise a position in the image at which the bitmap object is to be located and a location in a bitmap object cache at which the bitmap object may be stored. The bitmap object cache may cache one or more bitmap objects. For example, the bitmap cache may cache one or more bitmap objects associated with an image frame, associated with an animation, associated with one or more applications in which an animation may occur, associated with images rendered on client computing platform, and/or associated with other images or animations.

In some implementations, a bitmap object may comprise one or more of: bitmap data for the bitmap object, a flag indicating whether the bitmap data of the bitmap object has changed, a location of the bitmap object within the first image, one or more references to other bitmap objects, one or more references to child bitmap objects, dimensions relating to a size of the bitmap object, and/or other information. The flag may comprise one or more bits and may indicate whether the bitmap object has been compared to another object, whether the bitmap object matches another object, whether the bitmap object does not match another object, and/or other information regarding the bitmap object. For example, the flag may store a compared designation that may indicate that the bitmap object has been compared to another object, a dirty designation that may indicate that the bitmap object does not match another object, a clear designation that may indicate that the bitmap object has not been compared to another object, and/or other designations that indicate information about the bitmap object. In some implementations, a flag may be marked as "clear," "compared," "dirty," or another term. Other terms may be used to indicate that a bitmap object has not been compared, has been compared, and/or has been found to not match an object of the vector image. The flag of a bitmap object may be used to indicate other conditions relevant to the bitmap object.

A child bitmap object may comprise one or more of: bitmap data for the child bitmap object, a child flag indicating whether the child bitmap data of the child bitmap object has changed, a location of the child bitmap object within the bitmap object, one or more references to other child bitmap objects, dimensions relating to a size of the child object, and/or other information. The child flag may comprise one or more bits and may indicate whether the child bitmap object has been compared to another child object, whether the child bitmap object matches another child object, whether the child bitmap object does not match another child object, and/or other information regarding the child bitmap object. For example, the child flag may store a compared designation that may indicate that the child bitmap object has been compared to another child object, a dirty designation that may indicate that the child bitmap object does not match another child object, a clear designation that may indicate that the child bitmap object has not been compared to another child object, and/or other designations that indicate information about the child bitmap object. In some implementations, a child flag may be marked as "clear," "compared," "dirty," or another term. Other terms may be used to indicate that a child bitmap object has not been compared, has been compared, and/or has been found to not match an object of the vector image. The child flag of a child bitmap object may be used to indicate other conditions relevant to the child bitmap object.

A grandchild bitmap object (or great-grandchild bitmap object, or great-great grandchild bitmap object, etc.) may include similar information relating to previous related objects.

One or more bitmap objects may be generated based on information defining a vector image in a first frame in the animation. When information defining a vector image in a second frame in the animation is obtained, a color bound of a first object of the vector image may be detected. In some implementations, the vector image may be delineated into a grid of rectangular objects. Individual objects in the vector image may have a common height, length, and/or other dimension in the vector image. A rectangular object may comprise a sub-grid comprising one or more rectangular child items. Individual child objects may have a common height, length, and/or other dimension in the rectangular object. A color bound of a first object may comprise a first object of the grid of rectangular objects, may comprise a first object detected in a vector image without the grid delineation, and/or may comprise another type of object detected in the vector image.

When a first object of the vector image corresponding to the second frame in the animation is detected, the image list may be perused to determine whether a reference exists to a bitmap object at a location of the first image that corresponds to a location of the first object in the vector image. When a corresponding bitmap object is referenced in the image frame, the first object and the bitmap object may be compared. For example, pixel data corresponding to the first object and bitmap data corresponding to the bitmap object may be compared.

When the first object does not match the bitmap object, a flag of the bitmap object may be marked as dirty. This may be implemented by storing a dirty designation in a flag of the bitmap object. When one or more child objects of the first object may be detected, the one or more child objects may be compared to respective one or more child bitmap objects of the bitmap object in a manner that is similar or the same as the detection and comparison of the first object and the bitmap object. When the child object does not match the child bitmap object, a child flag of the child bitmap object may be marked as dirty. This may be implemented by storing a dirty designation in a child flag of the child bitmap object. When a child object matches a child bitmap object, another child object of the first object may be compared with another child bitmap object of the bitmap object. When the child objects of the first object have been compared, another object of the vector image may be detected. The other object may be detected and compared with another bitmap object referenced in the image list in a manner similar to the detection and comparison of the first object and the bitmap object.

In some implementations, when comparing the first object and the bitmap object, one or more pixels of the first object that match respective one or more pixels of the vector image may be removed from the first object to generate a non-transparent first object. The non-transparent first object may be compared with the bitmap object. In some implementations, when comparing the child object and the bitmap object, one or more pixels that match respective one or more pixels of the first object may be removed from the child object to generate a non-transparent child object. The non-transparent child object may be compared with the child bitmap object.

When a bitmap object at a location corresponding to the location of the first object is not referenced in the image list, a bitmap object corresponding to the first object may be generated and stored in the bitmap cache. In some implementations, before generating a bitmap object that corresponds to the first object, the bitmap object cache may be searched to determine whether a corresponding bitmap object exists in the cache. When a corresponding bitmap object is found in the bitmap object cache and/or a corresponding bitmap object is generated and stored in the bitmap object cache, the image list may be augmented with a reference to the corresponding bitmap object. For example, the image list may be augmented with a position in the image at which the bitmap object is to be located and a location in the bitmap cache at which the cached bitmap object is stored. A flag of the corresponding bitmap object may be marked dirty. This may be implemented by storing a dirty designation in a flag of the corresponding bitmap object. When a child object is detected in the corresponding bitmap object, corresponding child objects may be generated. In some implementations, before generating a child bitmap object, the child bitmap object cache may be searched to determine whether a corresponding child bitmap object exists in the cache. When a corresponding child bitmap object exists in the child bitmap object cache and/or a corresponding child bitmap object is generated and stored in the child bitmap object cache, the bitmap object may be updated with a reference to the corresponding child bitmap object. Child flags of the respective child objects may be marked as dirty. This may be implemented by storing a dirty designation in the respective child flags of the respective child bitmap objects.

When the image list includes a reference to a bitmap object that has not been compared to an object in the vector image, the reference to the bitmap object may be removed from the image list.

In some implementations, a non-transitory electronic storage media may store information related to a first image of a first frame in an animation. The stored information may comprise an image list configured to store one or more references to one or more respective bitmap objects associated with the first image, a bitmap object cache configured to store one or more bitmap objects for the image, a bitmap object comprising one or more of: bitmap data, a flag indicating whether the bitmap data of the bitmap object has changed, a location of the bitmap object within the first image, one or more references to other bitmap objects, or one or more references to child bitmap objects, and instructions configured to cause a client computing platform to: receive a plurality of frames as part of an animation, obtain information defining a vector image in a second frame in an animation, the second frame being obtained subsequent to the first frame, detect a color bound of a first object at a first location of the vector image, compare the first object with a bitmap object of the first image at a bitmap location of the bitmap image corresponding to the first location of the vector image, and responsive to the first object not matching the bitmap object, mark a flag of the bitmap object as dirty.

In some implementations, a second image in an animation obtained subsequent to a first image in an animation may be rendered based on an image list. The image list may include references to bitmap objects that comprise flags that indicate whether a bitmap object of the second frame has changed from the first frame. For example, a method of rendering an image may comprise receiving a plurality of frames as part of an animation, maintaining an image list configured to store one or more references to one or more respective bitmap objects associated with a first image of the animation, maintaining, for a bitmap object associated with the first image, one or more of: bitmap data, a flag indicating whether the bitmap data of the bitmap object has changed, a location of the bitmap object within the first image, one or more references to other bitmap objects, or one or more references to child bitmap objects, obtaining information defining a vector image in a second frame in the animation, the second frame being obtained subsequent to the first frame, retrieving, for a first bitmap object at a first location of the first image, a first flag associated with the first bitmap object, responsive to the first flag indicating that the first bitmap object has changed, retrieving, for a first child bitmap object at a first child bitmap location of the first bitmap object, a first child flag, and responsive to the first child flag indicating that the first child bitmap object has changed: detecting a first child color bound of a first child object of a first object of the vector image at a child location of the vector image corresponding to the first child bitmap location of the first bitmap object, implementing the vector information to rasterize the first child object within the first child color bound of the vector image to generate first child bitmap data for the first child object, and updating the first child bitmap object with the generated first child bitmap data. The method may be implemented in a computer system comprising one or more processors configured to execute computer program modules.

In some implementations, a non-transitory electronic storage media may store information related to an image. The stored information may comprise an image list configured to store one or more references to one or more respective bitmap objects associated with a first image of a first frame in an animation, a bitmap object cache configured to store one or more bitmap objects for the first image, a bitmap object comprising one or more of: bitmap data, a flag indicating whether the bitmap data of the bitmap object has changed, a location of the bitmap object within the first image, one or more references to other bitmap objects, or one or more references to child bitmap objects, a child bitmap object cache configured to store one or more child bitmap objects for a bitmap object, and instructions configured to cause a client computing platform to receive a plurality of frames as part of the animation, obtain information defining a vector image in a second frame in the animation, the second frame being obtained subsequent to the first frame, retrieve, for a first bitmap object at a first bitmap location of the first image, a first flag associated with the first bitmap object, responsive to the first flag indicating that the first bitmap object has changed, retrieve, for a first child bitmap object at a first child bitmap location of the first bitmap object, a first child flag, responsive to the first child flag indicating that the first child bitmap object has changed: detect a first child color bound of a first child object of a first object of the vector image at a child location of the vector image corresponding to the first child bitmap location of the first bitmap object, implement the vector information to rasterize the first child object within the first child color bound of the vector image to generate first child bitmap data for the first child object, and update the first child bitmap object with the generated first child bitmap data.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
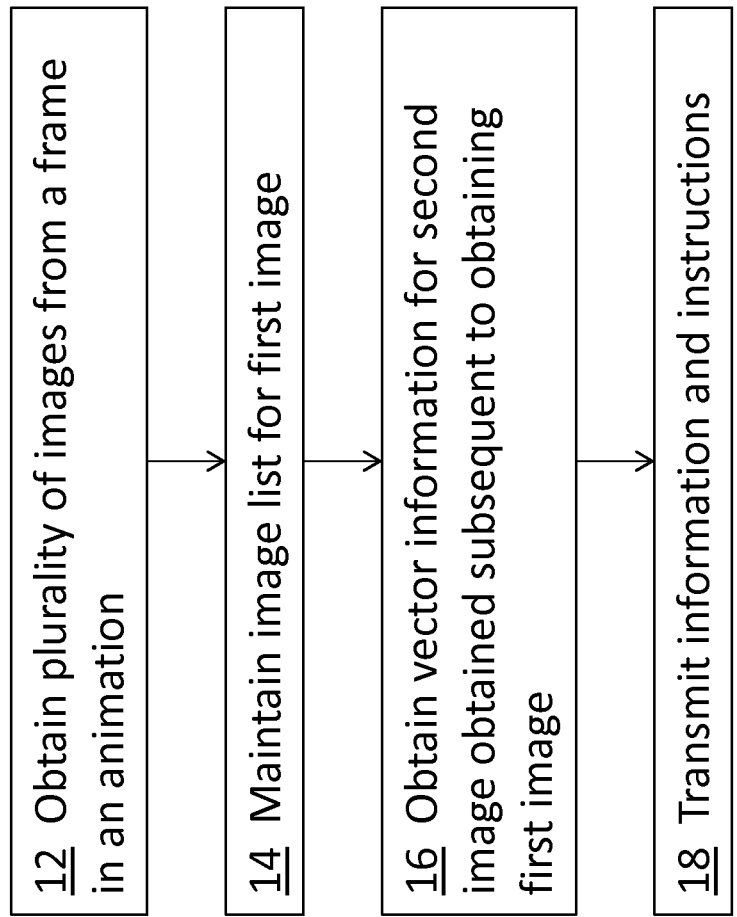
FIG. 1 illustrates an exemplary method of recursively rendering an image via a client computing platform, including marking renderable items of the image that have changed from a previous image, according to an aspect of the invention.

FIG. 1 illustrates an exemplary method 10 of recursively rendering an image for a client computing platform. The image may be an image from a frame in an animation. The method may include obtaining vector information of the image. In some implementations, the method may include marking one or more bitmap objects of a recursively rendered list of bitmap objects as changed from a previously obtained image. In some implementations, the method may comprise rendering one or more bitmap objects marked as changed from the previously obtained image.

Method 10 may be performed, for example, as part of hosting an online game, hosting an online video, and/or providing other media to users over a network (e.g., the Internet and/or other networks). Method 10 may facilitate rendering and/or display of the image in a frame of animation on the client computing platform. For example, method 10 may reduce the resources (e.g., processing, storage, etc.) required on the client computing platform to assemble and/or display an image in a frame in an animation, may reduce the amount of information sent over the network to enable the client computing platform to assemble and/or display an image in a frame of the animation, and/or enhance other aspects of the transmission, retrieval, and/or display of the image.

At an operation 12, a plurality of images from a respective plurality of frames in an animation may be obtained. An image may define a visual appearance of a frame in an animation. The image information may include pixel information (e.g., defining color value for individual pixels), vector information (e.g., defining shapes and fill), and/or other types of image information. In some implementations, the image may be a vector image of a frame. The vector image may comprise one or more of vector data, a flash FLD compressed video stream, content embedded in a SWF file data, or F4v data. Obtaining the image information may include accessing stored image information, receiving image information over a network, receiving image information through a user interface, and/or obtaining the image information in other ways.

At an operation 14, an image list may be maintained for a first image of a first frame in the animation. The image list may comprise references to one or more bitmap objects that may be rendered to display the first image relating to the first frame in an animation. In some implementations, a reference to a bitmap object in the image list may comprise a position in the image at which the bitmap object is to be located and a location in a bitmap object cache at which the bitmap object may be stored. The bitmap object cache may cache one or more bitmap objects. The bitmap object cache may cache one or more bitmap objects associated with an image frame, associated with an animation, associated with one or more applications in which an animation may occur, associated with images rendered on client computing platform, and/or associated with other images or animations.

In some implementations, a bitmap object may comprise one or more of: bitmap data for the bitmap object, a flag indicating whether the bitmap data of the bitmap object has changed, a location of the bitmap object within the first image, one or more references to other bitmap objects, one or more references to child bitmap objects, dimensions related to a size of the bitmap object, and/or other information. The flag may comprise one or more bits and may indicate whether the bitmap object has been compared to another object, whether the bitmap object matches another object, whether the bitmap object does not match another object, and/or other information regarding the bitmap object. For example, the flag may store a compared designation that may indicate that the bitmap object has been compared to another object, a dirty designation that may indicate that the bitmap object does not match another object, a clear designation that may indicate that the bitmap object has not been compared to another object, and/or other designations that indicate information about the bitmap object. In some implementations, a flag may be marked as "clear," "compared," "dirty," or another term. Other terms may be used to indicate that a bitmap object has not been compared, has been compared, and/or has been found to not match an object of the vector image. The flag of a bitmap object may be used to indicate other conditions relevant to the bitmap object.

A child bitmap object may comprise one or more of: bitmap data for the child bitmap object, a child flag indicating whether the bitmap data of the child bitmap object has changed, a location of the child bitmap object within the bitmap object, one or more references to other child bitmap objects, one or more references to grandchildren bitmap objects, dimensions related to a size of the child bitmap object, and/or other information.

The child flag may comprise one or more bits and may indicate whether the child bitmap object has been compared to another child object, whether the child bitmap object matches another object, whether the child bitmap object does not match another child object, and/or other information regarding the child bitmap object. For example, the child flag may store a compared designation that may indicate that the child bitmap object has been compared to another child object, a dirty designation that may indicate that the child bitmap object does not match another child object, a clear designation that may indicate that the child bitmap object has not been compared to another child object, and/or other designations that indicate information about the child bitmap object. In some implementations, a child flag may be marked as "clear," "compared," or "dirty." Other terms may be used to indicate that a child bitmap object has not been compared, has been compared, and/or has been found to not match a child object of the vector image. The child flag of a child bitmap object may be used to indicate other conditions relevant to the child bitmap object.

In some implementations, the one or more references to other child bitmap objects may be references to one or more respective child bitmap objects cached in the child bitmap object cache. In some implementations, the references to other child bitmap objects may be references to respective one or more bitmap objects cached in the bitmap object cache.

A grandchild bitmap object (or great-grandchild bitmap object, or great-great grandchild bitmap object) may include similar information relating to previous related objects. Grandchildren bitmap objects (or great-grandchildren bitmap objects) may be cached in a respective grandchild bitmap object cache (or great-grandchild bitmap cache) or may be cached in the bitmap object cache.

At an operation 16, vector information defining a vector image in a second frame of the animation may be obtained, where the second frame may be obtained subsequent to the first frame. The vector information may be obtained from the obtained second image. For example, the vector information may be obtained from image information that defines a visual appearance of the second frame in an animation. Obtaining the vector information may include receiving the vector information defining a vector image in the second frame in an animation over a network, accessing stored vector information corresponding to the second frame, receiving vector information corresponding to the second frame through a user interface, determining vector information corresponding to the second frame through image information obtained at an operation 12, and/or obtaining the vector information corresponding to the second frame in other ways.

At an operation 18, one or more bitmap objects referenced in the image list may be marked as changed from the first frame based on the obtained vector information. At operation 18, instructions may be transmitted to the client computing device. The instructions may be configured to cause the client computing platform to mark a flag of one or more bitmap objects referenced in the image list as dirty based on a comparison of the respective bitmap objects and objects of the obtained vector image corresponding to the second frame. In some implementations, the instructions may be configured to cause the client computing platform to obtain information defining a vector image in a second frame in the animation, where the second frame is obtained subsequent to the first frame. An image list may be maintained that comprises one or more references to one or more respective bitmap objects associated with the first image of the first frame in the animation.

When information defining a vector image in a second frame in the animation is obtained, a color bound of a first object of the vector image may be detected. In some implementations, the vector image may be delineated into a grid of rectangular objects. Individual objects in the vector image may have a common height, length, and/or other dimension in the vector image. A rectangular object may also comprise a sub-grid comprising one or more rectangular child objects. Individual child objects may have a common height, length and/or other dimension in the rectangular object. A color bound of a first object may comprise a first object of the grid of rectangular objects, may comprise a first object detected in a vector image without the grid delineation, and/or may comprise another type of object detected in the vector image. One or more of the objects in the vector image may include one or more child objects. The one or more child objects may be delineated by respective color bounds within a color bound of an object. In some implementations, the one or more child objects may correspond to one or more rectangular child objects.

When a first object of the vector image corresponding to the second frame in the animation is detected, the image list may be perused to determine whether a reference exists to a bitmap object at a location of the first image that corresponds to a location of the first object in the vector image. When a bitmap object at a location of the first image corresponding to the location of the first object in the vector image exists in the image frame, the first object and the bitmap object may be compared. In some implementations, pixel data corresponding to the first object and bitmap data corresponding to the bitmap object may be compared. In some implementations, pixel data corresponding to the first object and pixel data corresponding to the bitmap object may be compared. In some implementations, the vector information may be implemented to rasterize the first object and generate bitmap data corresponding to the first object. Implementing vector information to rasterize an object may be done in a variety of ways that are known to persons of skill in the art. For example, rasterizing the vector information to generate bitmap data for the first object may be implemented by known methods. The generated bitmap data of the first object may be compared with bitmap data of the bitmap object.

When the first object does not match the bitmap object, a flag of the bitmap object may be marked as dirty. This may be implemented by storing a dirty designation in a flag of the bitmap object. When one or more child objects of the first object are detected, the one or more child objects may be compared to respective one or more child bitmap objects of the bitmap object in a manner that is similar or the same as the detection and comparison of the first object and the bitmap object. When the child object does not match the child bitmap object, a child flag of the child bitmap object may be marked as dirty. This may be implemented by storing a dirty designation in a child flag of the child bitmap object. When a child object matches a child bitmap object, another child object of the first object may be compared with another child bitmap object of the bitmap object. When the child objects of the first object have been compared, another object of the vector image may be detected. The other object may be detected and compared with another bitmap object referenced in the image list in a manner similar to the detection and comparison of the first object and the bitmap object.

In some implementations, when comparing the first object and the bitmap object, one or more pixels of the first object that match respective one or more pixels of the vector image may be removed from the first object to generate a non-transparent first object. The non-transparent first object may be compared with the bitmap object. In some implementations, when comparing the child object and the bitmap object, one or more pixels that match respective one or more pixels of the first object may be removed from the child object to generate a non-transparent child object. The non-transparent child object may be compared with the child bitmap object.

When a bitmap object at a location corresponding to the location of the first object is not referenced in the image list, a bitmap object corresponding to the first object is generated and stored in the bitmap cache. In some implementations, before generating a bitmap object that corresponds to the first object, the bitmap cache may be searched to determine whether a corresponding bitmap object exists in the cache. When a corresponding bitmap object is found in the bitmap object cache and/or a corresponding bitmap object is generated and stored in the bitmap object cache, the image list may be augmented with a reference to the corresponding bitmap object. For example, the image list may be augmented with a position in the image at which the bitmap object is to be located and a location in the bitmap cache at which the cached bitmap object is stored. A flag of the corresponding bitmap object may be marked dirty. This may be implemented by storing a dirty designation in a flag of the corresponding bitmap object. When a child object is detected in the corresponding bitmap object, corresponding child objects may be generated. In some implementations, before generating a child bitmap object, the child bitmap object cache may be searched to determine whether a corresponding child bitmap object exists in the child bitmap object cache. When a corresponding child bitmap object exists in the child bitmap object cache and/or a corresponding child bitmap object is generated and stored in the child bitmap object cache, the bitmap object may be updated with a reference to the corresponding child bitmap object. Child flags of the respective child objects may be marked as dirty. This may be implemented by storing a dirty designation in respective child flags of the respective child bitmap objects. A bitmap object may be generated and stored in a bitmap cache and a child bitmap object may be generated and stored in a child bitmap object cache in a manner similar to that set forth in pending U.S. patent application Ser. No. 13/644,644, filed on Oct. 4, 2012, incorporated herein by reference.

When the image list includes a reference to a bitmap object that has not been compared to an object in the vector image, the reference to the bitmap object may be removed from the image list. For example, when the objects in the vector image have been compared with the bitmap objects referenced in an image list, and an nth bitmap object has a flag marked as cleared, a reference to the nth bitmap object may be removed from the image list. In some implementations, before an object of the vector image is compared with a bitmap object referenced in the image list, flags of the individual respective bitmap objects may be marked as cleared to indicate that the respective bitmap object has not been compared. This may be implemented by storing a clear designation in respective flags of the bitmap objects. When a bitmap object is compared with an object of the vector image, the flag may be marked as compared to indicate that a comparison has occurred. This may be implemented by storing a compared designation in a flag of the bitmap object. When the bitmap object does not match the object of the vector image, the flag may be marked as dirty to indicate the mismatch. This may be implemented by storing a dirty designation in a flag of the bitmap object. A reference to a bitmap object with a flag marked as clear may be removed from the image list when the objects of the vector image have been compared with bitmap objects referenced in the image list. Other methods of determining whether the bitmap objects referenced in the image list have been compared to objects in the vector image may exist.

Figure 2:
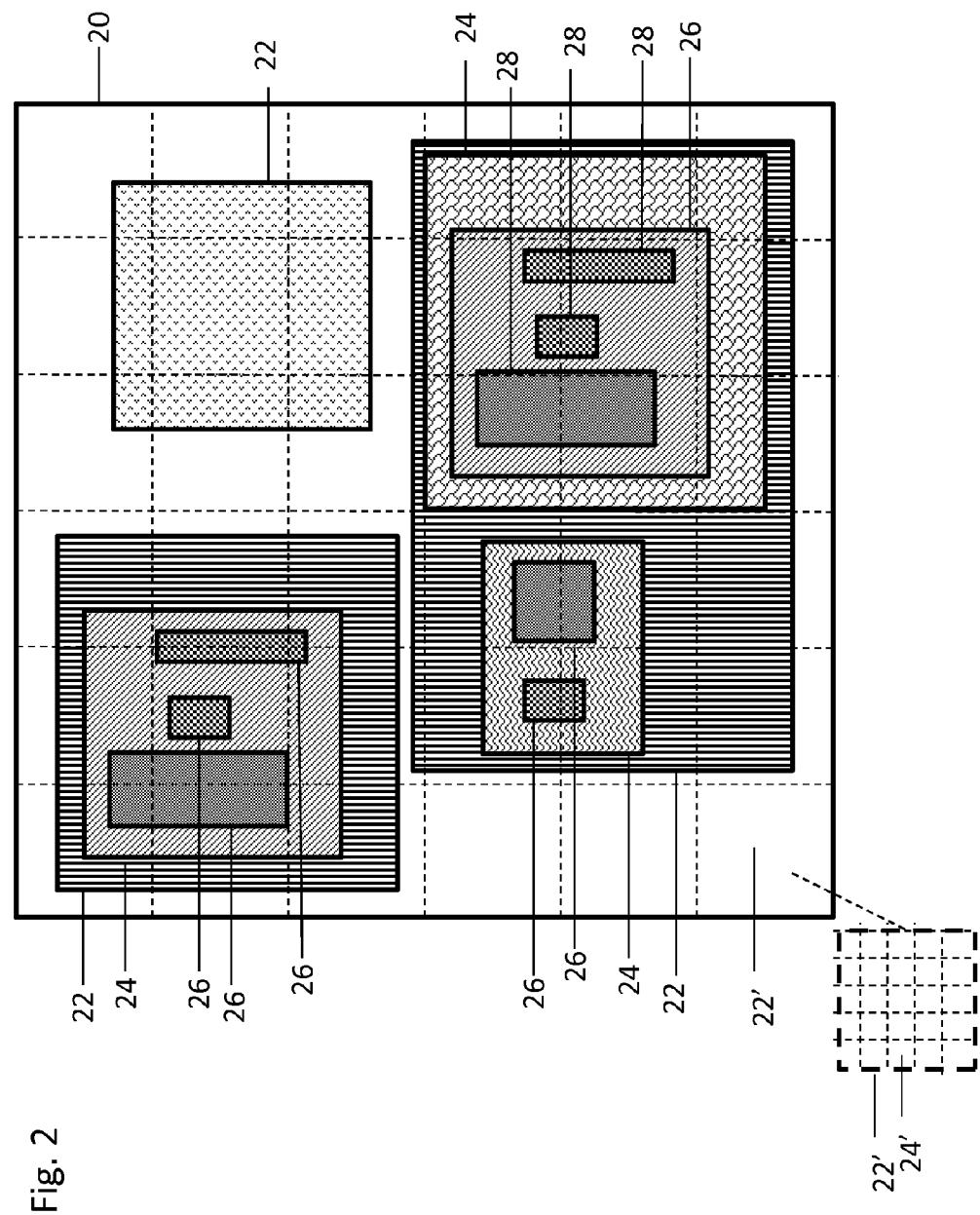
FIG. 2 illustrates an exemplary delineation of objects in a vector image.

By way of illustration, FIG. 2 illustrates an exemplary delineation of objects in a vector image. FIG. 2 depicts a vector image 20, one or more objects 22, one or more child objects 24, one or more grandchild objects 26, one or more great-grandchild objects 28, and/or other visual objects delineated in the vector image 20. As is described herein, one or more objects 22, one or more child objects 24, one or more grandchild objects 26, one or more great-grandchild objects 28, and/or other visual objects delineated in the vector image 20 may be rendered to display an image relating to a frame in an animation. In some implementations, the vector image 20 may be delineated as a rectangular grid of objects 22'. The rectangular objects 22' may comprise a sub-grid comprising one or more rectangular child objects 24'. Individual rectangular objects 22' in the vector image may have a common height, length, and/or other dimension in the vector image. A child object 24' may comprise a sub-sub grid comprising one or more grandchildren objects. Individual child objects 24' may have a common height, length and/or other dimension in the rectangular object. The objects of a vector image may comprise one or more objects 22, one or more objects 22', a combination thereof, and/or other visual objects delineated in the vector image 20.

Figure 3:
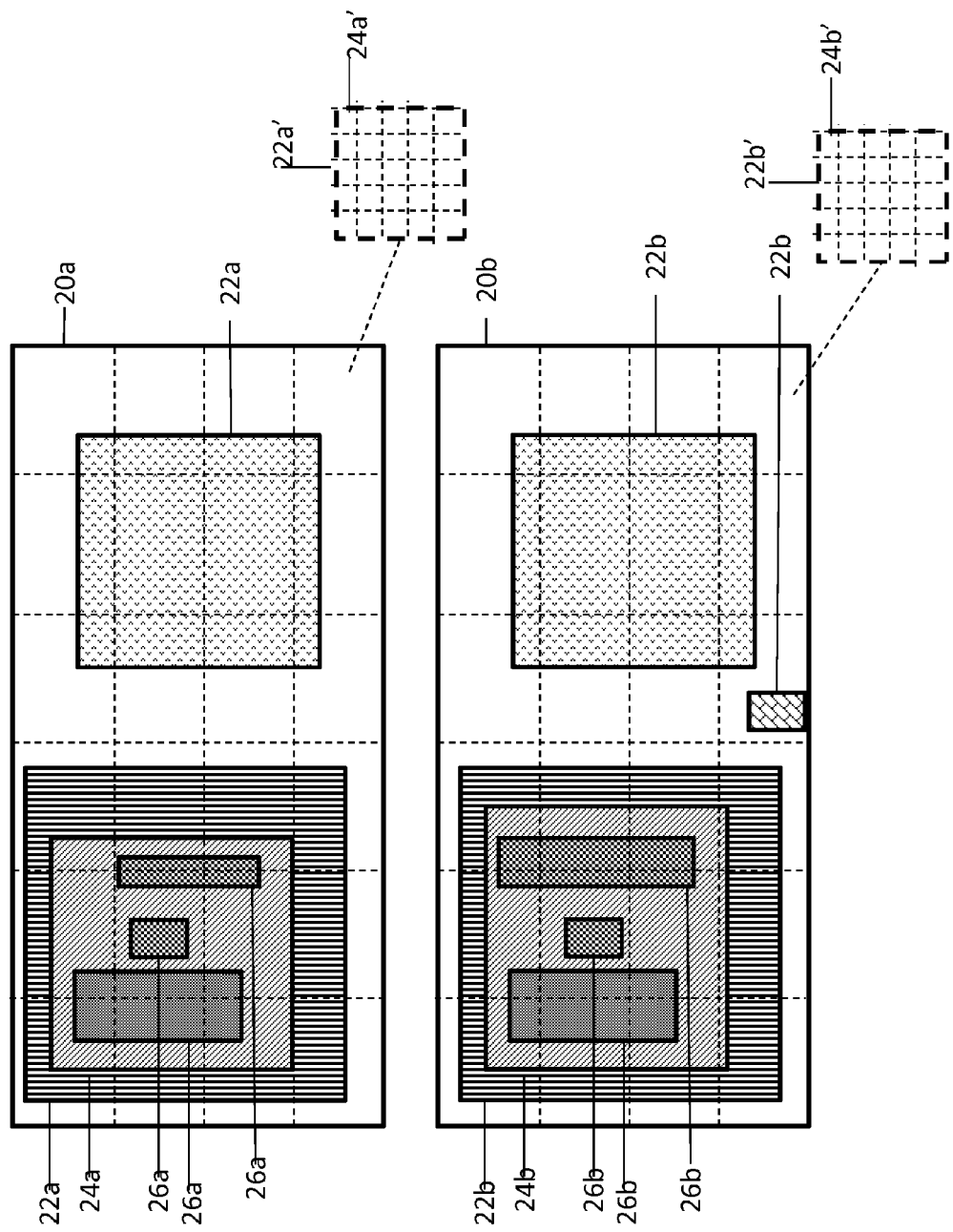
FIGS. 3A and 3B illustrate an exemplary delineation of objects in a first frame and a subsequently obtained second frame.

By way of illustration, FIGS. 3A and 3B illustrate exemplary delineations of objects in a first vector image and a second vector image obtained subsequent to the first vector image, respectively.

FIG. 3A depicts a vector image 20a, one or more objects 22a, one or more child objects 24a, one or more grandchild objects 26a, one or more great-grandchild objects 28a, and/or other visual objects delineated in the first vector image 20a. As is described herein, one or more objects 22a, one or more child objects 24a, one or more grandchild objects 26a, one or more great-grandchild objects 28a, and/or other visual objects delineated in the first vector image 20a may be rendered to display an image relating to a frame in an animation. In some implementations, the vector image 20a may be delineated as a rectangular grid of objects 22a'. The rectangular objects 22a' may comprise a sub-grid comprising one or more rectangular child objects 24a'. A child object 24a' may comprise a sub-sub grid comprising one or more grandchildren objects. The objects of a vector image may comprise one or more objects 22a, one or more objects 22a', a combination thereof, and/or other visual objects delineated in the first vector image 20a.

FIG. 3A depicts a second vector image 20b, one or more objects 22b, one or more child objects 24b, one or more grandchild objects 26b, one or more great-grandchild objects 28b, and/or other visual objects delineated in the second vector image 20b. In some implementations, the vector image 20b may be delineated as a rectangular grid of objects 22b'. The rectangular objects 22b' may comprise a sub-grid comprising one or more rectangular child objects 24b'. A child object 24b' may comprise a sub-sub grid comprising one or more grandchildren objects. The objects of a vector image may comprise one or more objects 22b, one or more objects 22b', a combination thereof, and/or other visual objects delineated in the second vector image 20b. In some implementations, one or more objects delineated in the second vector image 20b may be different from one or more corresponding objects in the first vector image 20a.

Figure 4:
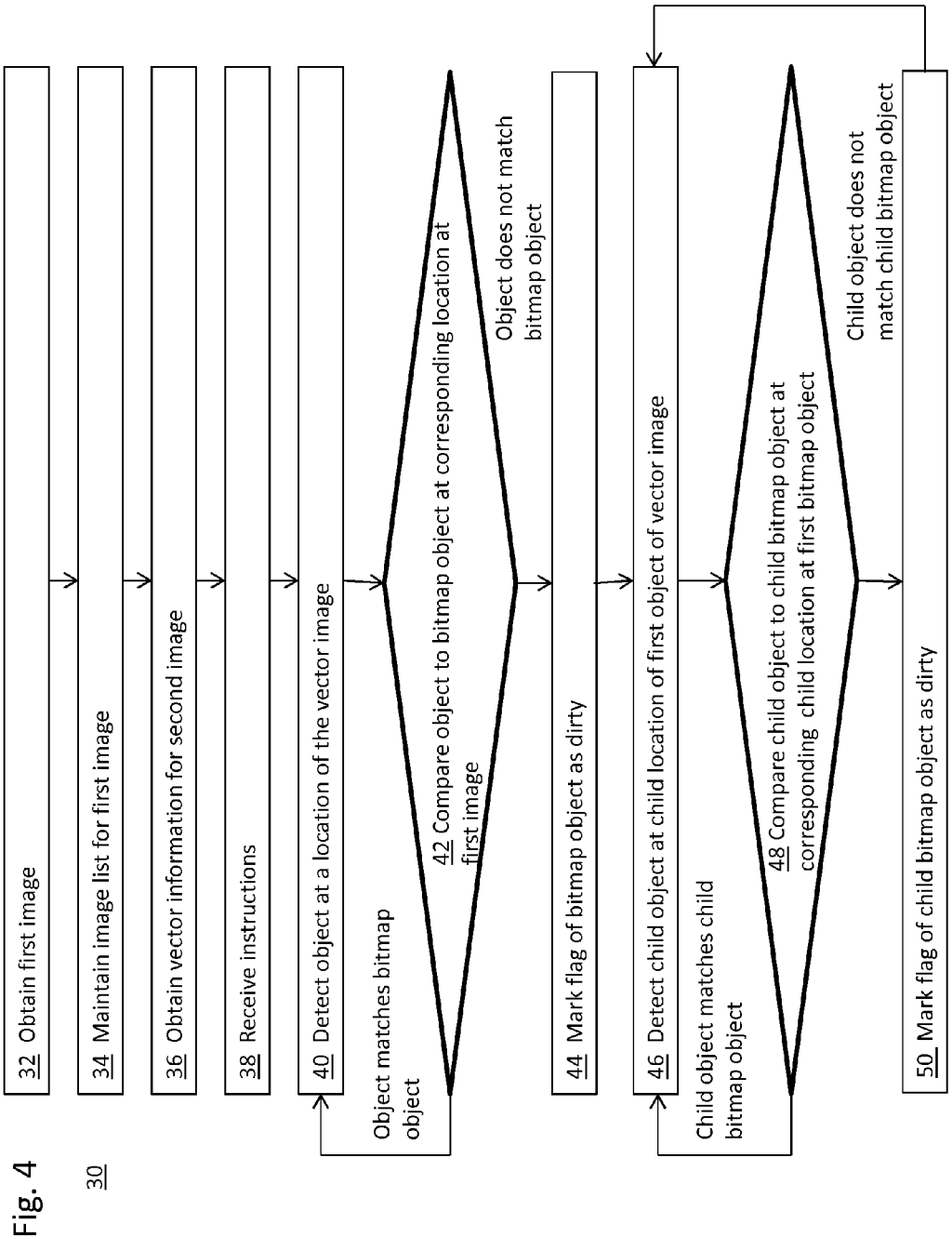
FIG. 4 illustrates an exemplary method of recursively rendering an image via a client computing platform, including marking renderable items of the image that have changed from a previous image, according to an aspect of the invention.

FIG. 4 illustrates an exemplary method 30 of recursively rendering an image for a client computing platform, including marking renderable items of the image that have changed from a previous image. The image may be an image from a frame in an animation, such as image 20b. The previous image may be an image from a frame in an animation such as image 20a. The method may include obtaining a first image, maintaining an image list of bitmap objects associated with the first image, obtaining vector information of a second image and marking bitmap objects referenced in the image list as changed from the first image to the second image. Method 30 may be implemented on a client computing platform configured to recursively render one or more bitmap objects based on images in frames in an animation.

At an operation 32, a first image may be obtained. For example, the image may be received over a network. The image may be same or of a similar type to the images discussed with respect to operation 12 and may be obtained in a same or a similar manner.

At an operation 34, an image list may be maintained for the first image. In some implementations, the image list may be stored at the client computing device. In some implementations, the image list may be received over a network. The received image list may be compared to an image list maintained at the client computing platform. When the received image list is more recent than the maintained image list, the maintained image list may be replaced by the received image list. An image list may be considered more recent based on one or more criteria. For example, a first image list may be considered more recent than a second image list when the first image list contains more items, has a newer date, has a newer time stamp, and/or based on other criteria. The image list may be a same or of a similar type to the image list described with respect to operation 14. The bitmap objects referenced in the image list may be obtained or generated in a manner similar or the same as that discussed in reference to operation 14.

At an operation 36, vector information defining a vector image in a second frame of the animation may be obtained. The vector information may be obtained in a manner similar or the same as that described with respect to operation 16.

At an operation 38, instructions configured to cause the client computing platform to render an image by marking one or more bitmap objects referenced in the image list as changed from the first frame. The instructions may be configured to cause the client computing platform to mark a flag of one or more bitmap objects referenced in the image list as dirty based on a comparison of the respective bitmap objects and objects of a subsequently obtained image. In some implementations, the instructions may be configured to cause the client computing platform to obtain information defining a vector in image in a second frame in the animation, where the second frame is obtained subsequent to a first frame in the animation. An image list may be maintained that comprises one or more references to one or more respective bitmap objects associated with the first image of the first frame in the animation.

At an operation 40, when information defining a vector image in a second frame in the animation is obtained, a color bound of a first object of the vector image may be detected. In some implementations, the vector image may be delineated into a grid of rectangular objects. Individual objects may have a common height, length, and/or other dimension in the vector image. A rectangular object may also comprise a sub-grid comprising one or more rectangular child objects. Individual child objects may have a common height, length, and/or other dimension in the rectangular object. A color bound of a first object may comprise a first object of the grid of rectangular objects, may comprise a first object detected in a vector image without the grid delineation, and/or may comprise another type of object detected in the vector image.

When a first object of the vector image corresponding to the second frame in the animation is detected, the image list may be perused to determine whether a reference exists to a bitmap object at a location of the first image that corresponds to a location of the first object in the vector image.

At an operation 42, when a bitmap object at a location of the first image corresponding to the location of the first object in the vector image exists in the image frame, the first object and the bitmap object may be compared. In some implementations, pixel data corresponding to the first object and bitmap data corresponding to the bitmap object may be compared. In some implementations, pixel data corresponding to the first object and pixel data corresponding to the bitmap object may be compared. In some implementations, the vector information may be implemented to rasterize the first object and generate bitmap data corresponding to the first object. Implementing vector information to rasterize an object may be done in a variety of ways that are known to persons of skill in the art. For example, rasterizing the vector information to generate bitmap data for the first object may be implemented by known methods. The generated bitmap data of the first object may be compared with bitmap data of the bitmap object.

At an operation 44, when the first object does not match the bitmap object, a flag of the bitmap object may be marked as dirty. In some implementations, this may be implemented by storing a dirty designation in a flag of the bitmap object. At an operation 46, one or more child objects of the first object may be detected. When the first object does not have any child objects, another object of the vector image may be detected. When the first object has one or more child objects, at an operation 48, the one or more child objects may be compared to respective one or more child bitmap objects of the bitmap object in a manner that is similar or the same as the detection and comparison of the first object and the bitmap object. At an operation 50, when the child object does not match the child bitmap object, a child flag of the child bitmap object may be marked as dirty. In some implementations, this may be implemented by storing a dirty designation in a child flag of the child bitmap object. When a child object matches a child bitmap object, at an operation 48, another child object of the first object may be compared with another child bitmap object of the bitmap object. When the child objects of the first object have been compared, another object of the vector image may be detected. The other object may be detected and compared with another bitmap object referenced in the image list in a manner similar to the detection and comparison of the first object and the bitmap object.

In some implementations, when comparing the first object and the bitmap object, one or more pixels of the first object that match respective one or more pixels of the vector image may be removed from the first object to generate a non-transparent first object. The non-transparent first object may be compared with the bitmap object. In some implementations, when comparing the child object and the bitmap object, one or more pixels that match respective one or more pixels of the first object may be removed from the child object to generate a non-transparent child object. The non-transparent child object may be compared with the child bitmap object.

When a bitmap object at a location corresponding to the location of the first object is not referenced in the image list, the image list may be augmented with a reference to a corresponding bitmap object. The bitmap object may be generated or obtained from the bitmap object cache in a manner similar or the same as that described above. A flag of the corresponding bitmap object may be marked dirty. This may be implemented by storing a dirty designation in a flag of the corresponding bitmap object. Child bitmap objects detected in the bitmap object may be generated or found in a child bitmap object cache in a manner similar or the same as that described above. Child flags of the respective child objects may be marked as dirty. This may be implemented by storing a dirty designation in respective child flags of the respective child bitmap objects.

When the image list includes a reference to a bitmap object that has not been compared to an object in the vector image, the reference to the bitmap object may be removed from the image list. A reference to a bitmap object may be removed in a manner similar or the same as that described above. Marking of bitmap objects may be maintained in a manner similar or the same as that described above.

Figure 5:
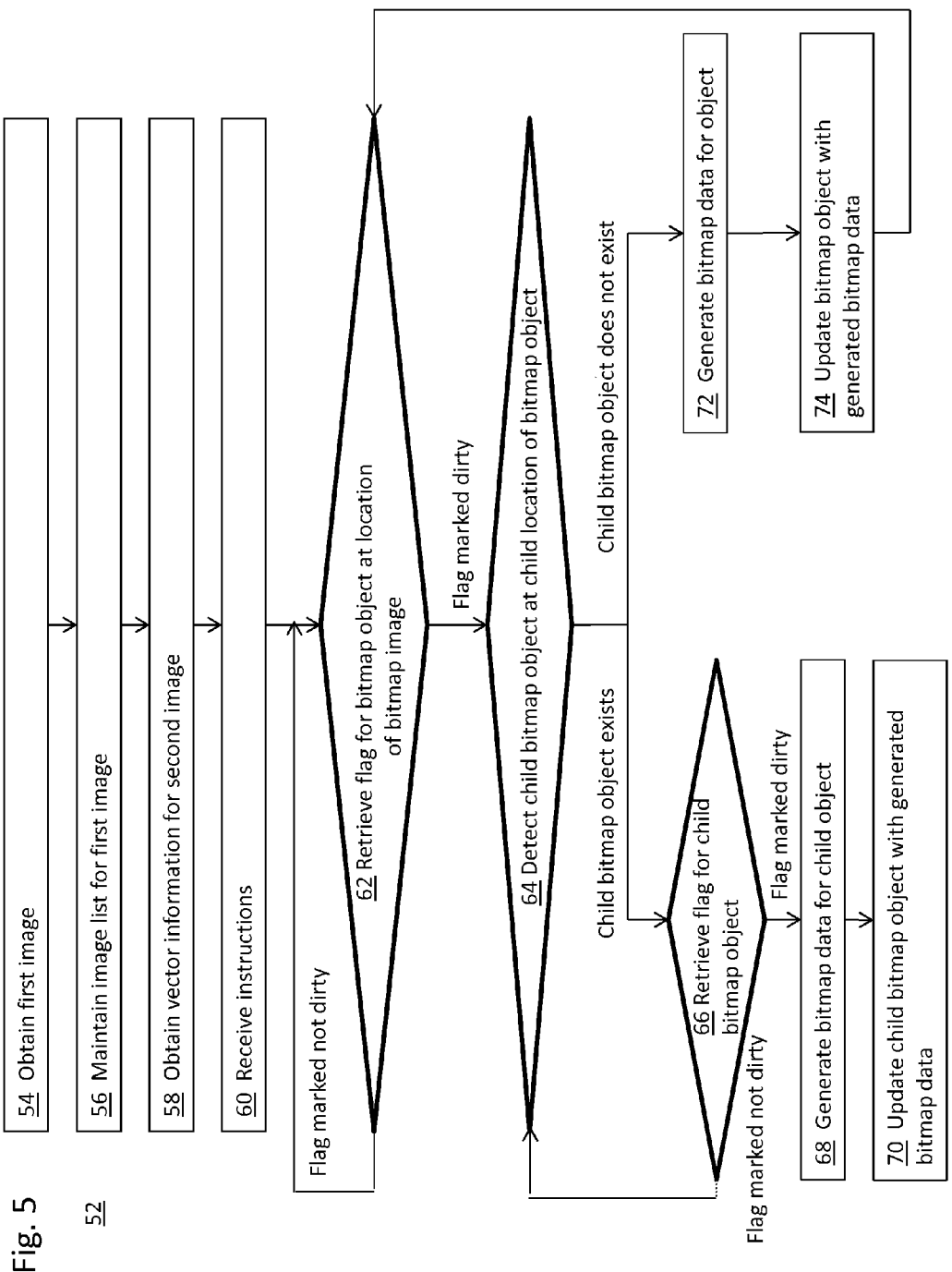
FIG. 5 illustrates an exemplary method of recursively rendering an image via a client computing platform, including marking renderable items of the image that have changed from a previous image, according to an aspect of the invention.

FIG. 5 illustrates an exemplary method 52 of recursively rendering an image for a client computing platform, including marking renderable items of the image that have changed from a previous image. The image may be a vector image from a second frame in an animation, such as vector image 20b. The previous image may be a vector image from a first frame in an animation, such as vector image 20a. The method 52 may include obtaining a first image, maintaining an image list of bitmap objects associated with the first image, obtaining vector information of a second image and rendering an image based on the image list and the obtained vector information. Method 52 may be implemented on a client computing platform configured to recursively render one or more bitmap objects based on an image in a frame in an animation.

At an operation 54, a first image may be obtained. For example, the first image may be received over a network. The image may be same or of a similar type to the image discussed with respect to operations 12 and/or 32 and may be obtained in a manner similar to or the same as the images discussed with respect to operations 12 and/or 32.

At an operation 56, an image list may be maintained for the first image. In some implementations, the image list may be stored at the client computing device. In some implementations, the image list may be received over a network. The image list may be maintained in a manner similar to that discussed with respect to operations 14 and/or 34. The image list may be a same or of a similar type and may be obtained in a same or similar manner as the image list described with respect to operations 14 and/or 34. The bitmap objects referenced in the image list may be obtained or generated in a manner similar or the same as that discussed in reference to operations 14 and/or 34.

At an operation 58, vector information defining a vector image in a second frame of the animation may be obtained. The vector information may be obtained in a manner similar or the same as that described with respect to operations 16 and/or 36.

At an operation 60, instructions configured to cause the client computing platform to recursively render the second image for a client computing platform, including marking renderable items of the image that have changed from a previous image. The instructions may be configured to cause the client computing platform to render the second image based on flags of respective bitmap objects in the image list. In some implementations, the instructions may be configured to cause the client computing platform to obtain information defining a vector in image in a second frame in the animation, where the second frame is obtained subsequent to the first frame. An image list may be maintained that comprises one or more references to one or more respective bitmap objects associated with the first image of the first frame in the animation. The one or more respective bitmap objects may include respective flags indicating whether a respective bitmap object has changed from the first frame to the second frame.

At an operation 62, a flag for a bitmap object referenced in the image list may be obtained. The bitmap object may be at a first location of the first image. When the flag of the bitmap object is not marked as dirty (e.g., the flag of the bitmap object is marked with a designation of clear, compared, and/or another designation), a flag for a second bitmap object referenced in the image list may be obtained at an operation 62.

When the flag of the bitmap object is marked as dirty (e.g., the flag of the bitmap object stores a dirty designation), a child bitmap object may be detected at a child location of the bitmap object at an operation 64.

At an operation 66, when one or more child bitmap objects exist in the bitmap object, a child flag for a child bitmap object may be retrieved. When the child flag does not store a dirty designation, another child bitmap object may be detected at another child location of the bitmap object at an operation 64.

When the child flag is marked as dirty, a color bound may be detected of a corresponding child object of a corresponding object at a location of the child object in the object in the vector image corresponding to the child location of the child bitmap object in the bitmap object. At an operation 68, the vector information of the vector image may be implemented to rasterize the child object and generate bitmap data for the child object. At an operation 70, the child bitmap object may be updated with the generated bitmap data for the child object. In some implementations, the child flag of the child object may be marked to indicate that the child bitmap object matches the corresponding child object of the vector image. This may be implemented by storing a compared designation in a child flag of the corresponding child bitmap object.

Returning to operation 64, when a child bitmap object of the bitmap object is not detected, bitmap data for a corresponding object in the vector image may be generated at an operation 72. For example, a color bound of the object at a location of the vector image corresponding to the location of the bitmap object in the first image may be detected. The vector information of the vector image may be implemented to rasterize the object and generate bitmap data for the object. At an operation 74, the bitmap object may be updated with the generated bitmap data for the object. In some implementations, the flag of the bitmap object may be marked to indicate that the bitmap object matches the corresponding object of the vector image. This may be implemented by storing a compared designation in a flag of the bitmap object.

The operations of methods 10, 30 and 52 presented herein are intended to be illustrative. In some implementations, methods 10, 30 and/or 52 may be accomplished with one or more additional operations not described, and/or without one or more of the operations discussed. Additionally, the order in which the operations of methods 10, 30 and/or 52 are illustrated in FIGS. 1, 4 and/or 5 and described herein is not intended to be limiting.

In some implementations, methods 10, 30 and/or 52 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of methods 10, 30 and/or 52 in response to instructions stored electronically on an electronic storage medium. The one or more processing devices may include one or more devices configured through hardware, firmware, and/or software to be specifically designed for execution of one or more of the operations of methods 10, 30 and/or 52.

Figure 6:
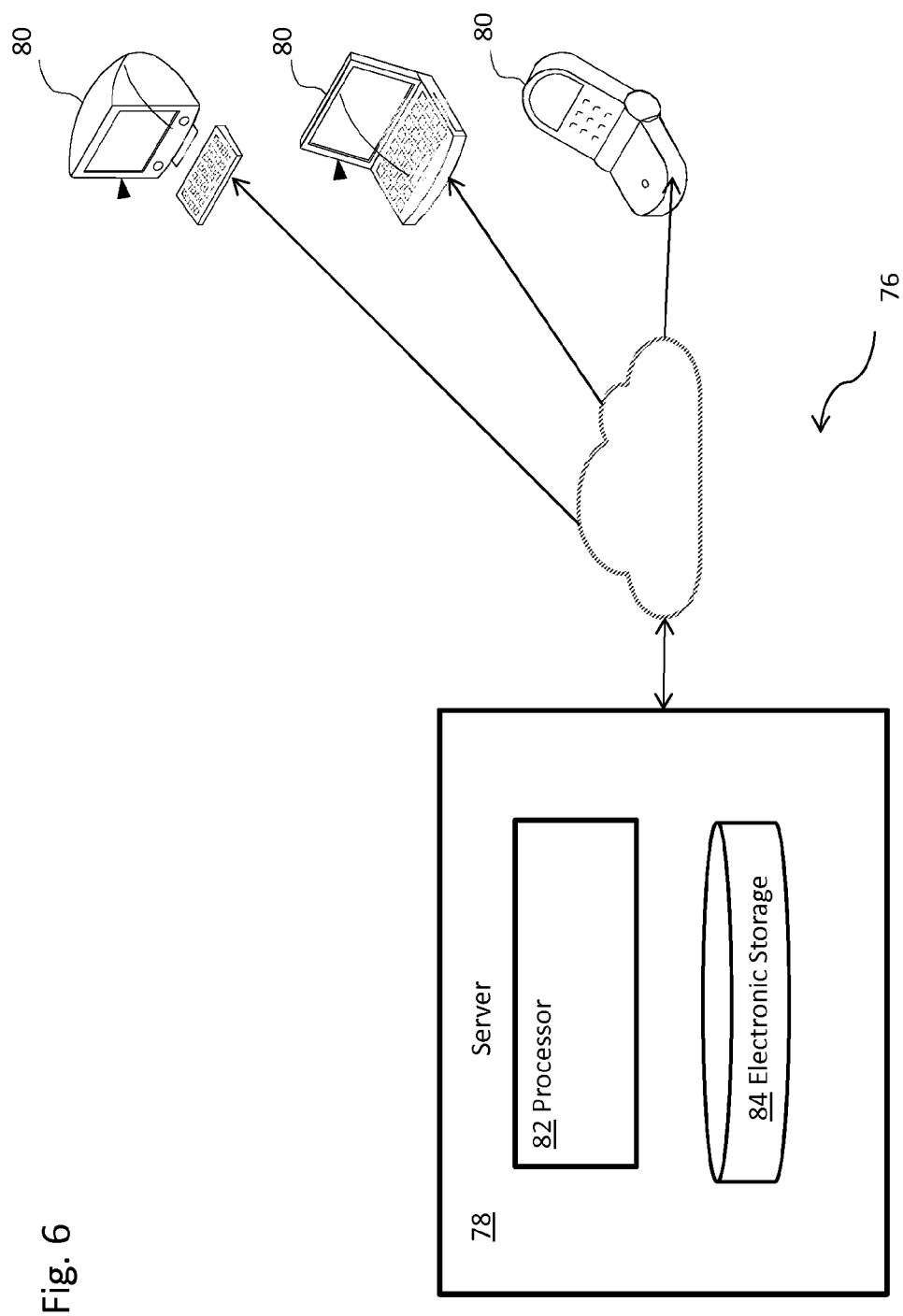
FIG. 6 illustrates a system configured to generate, transmit, and/or present a recursively rendered image for a client computing platform.

FIG. 6 illustrates a system 76 configured to generate and present a recursively rendered image to users. As can be seen in FIG. 6, system 76 may include one or more of a server 78, one or more client computing devices 80, and/or other components.

Server 78 may be configured to communicate with client computing devices 80 in a server/client architecture. By way of non-limiting example, server 78 may be configured to host an online game, a virtual space, an online video, and/or other content. The content hosted by server 78 may include an animation and/or an animation sequence served to client computing devices 80 by server 78. Server 78 may include one or more processors 82, electronic storage 84, and/or other components.

Processor 82 may provide information processing capabilities within server 78. Although processor 82 is shown in FIG. 6 as a single entity, this is not intended to be limiting, as processor 82 may include a plurality of processors operating in coordination or cooperation. This may include implementations in which server 78 includes multi-processor device, a farm of server devices operating together, and/or virtual resources provided by the cloud. Processor 82 may be configured to provide information to client computing platforms 80 over a network that causes client computing platforms to recursively render one or more bitmap objects from an image in a frame in an animation. For example, processor 82 may be configured to perform some or all of the functionality described herein with respect to method 10 (shown in FIG. 1).

Electronic storage 84 may electronic storage media that electronically stores information non-transiently. The electronic storage media of electronic storage 84 may include one or both of system storage that is provided integrally (i.e., substantially non-removable) with server 78 and/or removable storage that is removably connectable to server 78 via, for example, a port (e.g., a USB port, a firewire port, etc.) or a drive (e.g., a disk drive, etc.). Electronic storage 84 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 84 may include virtual storage resources, such as storage resources provided via a cloud and/or a virtual private network. Electronic storage 84 may store software algorithms, information determined by processor 82, information received from client computing platforms 80, and/or other information that enables server 78 to function properly.

Electronic storage 84 may non-transiently store information prior to transmission to client computing devices 80 that causes client computing platforms to present the recursively rendered image to users. For example, such information may include image information (e.g., as obtained at operations 12, 32, and/or 54 as shown in FIGS. 1, 4, and 5, and described herein), a bitmap object cache (e.g., as described herein), instructions for recursively rendering one or more bitmap objects from an image in a frame in an animation (e.g., as described with respect to operations shown in FIGS. 1, 4, and 5, and described herein), and/or other information.

Client computing platforms 80 may be computing platforms configured to provide an interface with users and system 76. A given client computing device 80 may include one or more processors, electronic storage that non-transiently stores information, and/or other components. By way of non-limiting example, the given client computing platform may include one or more of a smartphone, a handheld computer, a tablet device, a personal digital assistant, a laptop computer, a desktop computer, and/or other platforms. In presenting the animation to a user, the given client computing device 80 may be configured to perform some or all of the functionality described herein with respect to method 30 shown in FIG. 3 and/or method 52 shown in FIG. 5. Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A computer-implemented method of rendering an image, the method being implemented on a client computing platform, the method comprising:

receiving a plurality of frames as part of an animation;

maintaining an image list configured to store one or more references to one or more respective bitmap objects associated with a first image of a first frame in the animation;

maintaining, for a bitmap object associated with the first image, a flag indicating whether bitmap data of the bitmap object has changed and one or more of: the bitmap data, a location of the bitmap object within the first image, one or more references to other bitmap objects, or one or more references to child bitmap objects;

obtaining information defining a vector image in a second frame in the animation, the second frame being obtained subsequent to the first frame;

detecting a color bound of a first object at a first location of the vector image;

comparing the first object with the bitmap object of the first image at the bitmap location of the bitmap object corresponding to the first location of the vector image; and responsive to the first object not matching the bitmap object, marking a flag of the bitmap object as dirty.

2. The method of claim 1, wherein, responsive to the first image not including a corresponding bitmap object at the bitmap location, the method further comprises:
generating the corresponding bitmap object;
augmenting the image list with a reference to the corresponding bitmap object; and
marking a flag of the corresponding bitmap object as dirty.

3. The method of claim 1, wherein the method further comprises:
responsive to an nth bitmap object referenced in the image list not being compared with an object of the vector image, removing a reference to the nth bitmap object from the image list.

4. The method of claim 1, further comprising:
responsive to the first object not matching the bitmap object, detecting a color bound of a first child object at a first child location of the first object;
comparing the first child object with a child bitmap object of the first bitmap object, where the child bitmap object is at a child bitmap location of the first bitmap object corresponding to the first child location of the first object;
when the first child object does not match the child bitmap object, marking a flag of the child bitmap object as dirty; and
when the first child object matches the child bitmap object, detecting a color bound of a second child object at a second child location of the first object, and
comparing the second child object with a second child bitmap object of the first bitmap object, where the second child bitmap object is at a second child bitmap location of the first bitmap object corresponding to the second child location of the first object.

5. The method of claim 4, further comprising:
responsive to marking the flag of the child bitmap object as dirty:
detecting the color bound of the second child object at the second child location of the first object,
comparing the second child object with a second child bitmap object of the first bitmap object, where the second child bitmap object is at the second child bitmap object is at a second child bitmap location of the first bitmap object corresponding to the second child location of the first object; and
when the second child object does not match the second child bitmap object, marking a flag of the second child bitmap object as dirty.

6. The method of claim 1, further comprising:
responsive to the first object matching the bitmap object,
detecting a color bound of a second object at a second location of the vector image, and
comparing the second object with a second bitmap object of the first image, where the second bitmap object is at a second bitmap location of the first image corresponding to the second location of the second object.

7. The method of claim 1, further comprising:
detecting a color bound of a second object at a second location of the vector image, and
comparing the second object with a second bitmap object of the first image, where the second bitmap object is at a second bitmap location of the first image corresponding to the second location of the second object.

8. The method of claim 1, wherein comparing the first object with the bitmap object comprises:
removing, from the first object, one or more pixels that match respective one or more pixels of the vector image to generate a non-transparent first object; and
comparing the non-transparent first object with the bitmap object.

9. The method of claim 4, wherein comparing the first child object with the child bitmap object comprises:
removing, from the first child object, one or more pixels that match respective one or more pixels of the first object to generate a non-transparent first child object; and
comparing the non-transparent first child object with the bitmap child object.

10. Non-transitory electronic storage media storing information related to an image, the stored information comprising:
an image list configured to store one or more references to one or more respective bitmap objects associated with a first image of a first frame in the animation;
a bitmap object cache configured to store one or more bitmap objects for the first image, a bitmap object comprising a flag indicating whether bitmap data of the bitmap object has changed and one or more of: the bitmap data, a location of the bitmap object within the first image, one or more references to other bitmap objects, or one or more references to child bitmap objects; and
instructions configured to cause a client computing platform to:
receive a plurality of frames as part of an animation;
obtain information defining a vector image in a second frame in the animation, the second frame being obtained subsequent to the first frame;
detect a color bound of a first object at a first location of the vector image;
compare the first object with a bitmap object of the first image at a bitmap location of the bitmap object corresponding to the first location of the vector image; and
responsive to the first object not matching the bitmap object, mark a flag of the bitmap object as dirty.

11. The electronic storage media of claim 10, wherein, responsive to the first image not including a corresponding bitmap object at the bitmap location, the instructions are configured to cause a client computing platform to
generate the corresponding bitmap object;
augment the image list with a reference to the corresponding bitmap object; and
mark a flag of the corresponding bitmap object as dirty.

12. The electronic storage media of claim 10, wherein, responsive to an nth bitmap object referenced in the image list not being compared with an object of the vector image, the instructions are configured to cause a client computing platform to remove a reference to the nth bitmap object from the image list.

13. The electronic storage media of claim 10, wherein the instructions are configured to cause a client computing platform to
responsive to the first object not matching the bitmap object, detect a color bound of a first child object at a first child location of the first object;
compare the first child object with a child bitmap object of the first bitmap object, where the child bitmap object is at a child bitmap location of the first bitmap object corresponding to the first child location of the first object; and when the first child object does not match the child bitmap object, mark a flag of the child bitmap object as dirty; and when the first child object matches the child bitmap object,
detect a color bound of a second child object at a second child location of the first object, and
compare the second child object with a second child bitmap object of the first bitmap object, where the second child bitmap object is at a second child bitmap location of the first bitmap object corresponding to the second child location of the first object.

14. The electronic storage media of claim 13, wherein the instructions are configured to cause a client computing platform to responsive to marking the flag of the child bitmap object as dirty:
detect the color bound of the second child object at the second child location of the first object,
compare the second child object with the second child bitmap object of the first bitmap object, where the second child bitmap object is at the second child bitmap location of the first bitmap object corresponding to the second child location of the first object; and
when the second child object does not match the second child bitmap object, mark a flag of the second child bitmap object as dirty.

15. The electronic storage media of claim 13, wherein the instructions are configured to cause a client computing platform to responsive to the first object matching the bitmap object,
detect a color bound of a second object at a second location of the vector image, and
compare the second object with a second bitmap object of the first image, where the second bitmap object is at a second bitmap location of the first image corresponding to the second location of the second object.

16. The electronic storage media of claim 10, wherein the instructions are configured to cause a client computing platform to detect a color bound of a second object at a second location of the vector image, and
compare the second object with a second bitmap object of the first image, where the second bitmap object is at a second bitmap location of the first image corresponding to the second location of the second object.

17. The electronic storage media of claim 10, wherein the instructions are configured to cause a client computing platform to compare the first object with the bitmap object by removing, from the first object, one or more pixels that match respective one or more pixels of the vector image to generate a non-transparent first object; and
comparing the non-transparent first object with the bitmap object.

18. The electronic storage media of claim 13, wherein the instructions are configured to cause a client computing platform to compare the first child object with the child bitmap object by removing, from the first child object, one or more pixels that match respective one or more pixels of the first object to generate a non-transparent first child object; and
comparing the non-transparent first child object with the bitmap child object.

19. A computer-implemented method of rendering an image, the method being implemented on a client computing platform, the method comprising:

receiving a plurality of frames as part of an animation;

maintaining an image list configured to store one or more references to one or more respective bitmap objects associated with a first image of the animation;

maintaining, for a bitmap object associated with the first image, a flag indicating whether bitmap data of the bitmap object has changed and one or more of: the bitmap data, a location of the bitmap object within the first image, one or more references to other bitmap objects, or one or more references to child bitmap objects;

obtaining information defining a vector image in a second frame in the animation, the second frame being obtained subsequent to the first frame;

retrieving, for a first bitmap object at a first location of the first image, a first flag associated with the first bitmap object;

responsive to the first flag indicating that the first bitmap object has changed, retrieving, for a first child bitmap object at a first child bitmap location of the first bitmap object, a first child flag; and responsive to the first child flag indicating that the first child bitmap object has changed:
detecting a first child color bound of a first child object of a first object of the vector image at a child location of the vector image corresponding to the first child bitmap location of the first bitmap object;
implementing the vector information to rasterize the first child object within the first child color bound of the vector image to generate first child bitmap data for the first child object; and
updating the first child bitmap object with the generated first child bitmap data.

20. The method of claim 19, further comprising:
responsive to the first child flag indicating that the first child bitmap object has not changed,
when a second child bitmap object at a second child bitmap location is associated with the first bitmap object, retrieving, for the second child bitmap object, a second child flag associated with the second child bitmap object; and
when the first bitmap object is not associated with another child bitmap object, retrieving, for a second bitmap object at a second bitmap location of the first image, a second flag associated with the second bitmap object.

21. The method of claim 19, further comprising:
responsive to updating the first child bitmap object with the generated first child bitmap data:
when a second child bitmap object at a second child bitmap location is associated with the first bitmap object, retrieving, for the second child bitmap object, a second child flag; and
when the first bitmap object is not associated with another child bitmap object, retrieving, for a second bitmap object at a second bitmap location of the first image, a second flag associated with the second bitmap object.

22. The method of claim 19, further comprising:
responsive to the first flag indicating that the first bitmap object has not changed, retrieving, for a second bitmap object at a second bitmap location of the first image, a second flag associated with the second bitmap object;
responsive to the second flag indicating that the second bitmap object has changed, retrieving, for a second child bitmap object at a second child bitmap location of the first bitmap object, a second child flag; and
responsive to the second child flag indicating that the second child bitmap object has changed:

detecting a second child color bound of a second child object of a second object of the vector image at a second child location of the vector image corresponding to the second child bitmap location of the second child bitmap object;

implementing the vector information to rasterize the second child object within the second child color bound of the vector image to generate second child bitmap data for the second child object; and updating the second child bitmap object with the generated second child bitmap data.

23. The method of claim 19, wherein generating the first child bitmap data for the first child object comprises:

removing, from the first child object, one or more pixels that match respective one or more pixels of the first object.

24. Non-transitory electronic storage media storing information related to an image, the stored information comprising:

an image list configured to store one or more references to one or more respective bitmap objects associated with a first image of a first frame in an animation;

a bitmap object cache configured to store one or more bitmap objects for the first image, a bitmap object comprising a flag indicating whether bitmap data of the bitmap object has changed and one or more of: the bitmap data, a location of the bitmap object within the first image, one or more references to other bitmap objects, or one or more references to child bitmap objects;

a child bitmap object cache configured to store one or more child bitmap objects for a bitmap object; and instructions configured to cause a client computing platform to:

receive a plurality of frames as part of the animation;

obtain information defining a vector image in a second frame in the animation, the second frame being obtained subsequent to the first frame;

retrieve, for a first bitmap object at a first bitmap location of the first image, a first flag associated with the first bitmap object;

responsive to the first flag indicating that the first bitmap object has changed, retrieve, for a first child bitmap object at a first child bitmap location of the first bitmap object, a first child flag; and responsive to the first child flag indicating that the first child bitmap object has changed:

detect a first child color bound of a first child object of a first object of the vector image at a child location of the vector image corresponding to the first child bitmap location of the first bitmap object;

implement the vector information to rasterize the first child object within the first child color bound of the vector image to generate first child bitmap data for the first child object; and update the first child bitmap object with the generated first child bitmap data.

25. The electronic storage media of claim 24, wherein the instructions are configured to cause a client computing platform to responsive to the first child flag indicating that the first child bitmap object has not changed, when a second child bitmap object at a second child bitmap location is associated with the first bitmap object, retrieve, for the second child bitmap object, a second child flag associated with the second child bitmap object; and when the first bitmap object is not associated with another child bitmap object, retrieve, for a second bitmap object at a second bitmap location of the first image, a second flag associated with the second bitmap object.

26. The electronic storage media of claim 24, wherein the instructions are configured to cause a client computing platform to responsive to updating the first child bitmap object with the generated first child bitmap data:

when a second child bitmap object at a second child location is associated with the first bitmap object, retrieve, for the second child bitmap object at the second child bitmap location of the first child bitmap object, a second child dirty flag; and when the first bitmap object is not associated with another child bitmap object, retrieve, for a second bitmap object at a second bitmap location of the first image, a second flag associated with the second bitmap object.

27. The electronic storage media of claim 24, wherein the instructions are configured to cause a client computing platform to responsive to the first flag indicating that the first bitmap object has not changed, retrieve, for a second bitmap object at a second bitmap location of the first image, a second flag associated with the second bitmap object;

responsive to the second flag indicating that the second bitmap object has changed, retrieve, for a second child bitmap object at a second child bitmap location of the first bitmap object, a second child flag; and responsive to the second child flag indicating that the second child bitmap object has changed:

detect a second child color bound of a second child object of a second object of the vector image at a second child location of the vector image corresponding to the second child bitmap location of the second child bitmap object;

implement the vector information to rasterize the second child object within the second child color bound of the vector image to generate second child bitmap data for the second child object; and update the second child bitmap object with the generated second child bitmap data.

28. The electronic storage media of claim 24, wherein the instructions are configured to cause a client computing platform to generate the first child bitmap data for the first child object by removing, from the first child object, one or more pixels that match respective one or more pixels of the first object.

* * * * *

UNITED STATES PATENT AND TRADEMARK OFFICE
CERTIFICATE OF CORRECTION

PATENT NO.         : 9,171,381 B1
APPLICATION NO.    : 13/659801
DATED              : October 27, 2015
INVENTOR(S)        : Raymond Cook It is certified that error appears in the above-identified patent and that said Letters Patent is hereby corrected as shown below:

On the title page, change Item (72) Inventor to read:

--(72) Inventor: Raymond Cook, Castro Valley, CA (US)--

Signed and Sealed this
Fifth Day of April, 2016

Michelle K. Lee
*Director of the United States Patent and Trademark Office*